US008166150B2

(12) United States Patent
Ung et al.

(10) Patent No.: US 8,166,150 B2
(45) Date of Patent: **\*Apr. 24, 2012**

(54) SYSTEMS AND METHODS ENABLING INTEROPERABILITY BETWEEN NETWORK-CENTRIC OPERATION (NCO) ENVIRONMENTS

(75) Inventors: Kevin Y. Ung, Bellevue, WA (US); Donald B. Farr, Madison, AL (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/904,616

(22) Filed: Oct. 14, 2010

(65) Prior Publication Data

US 2011/0029656 A1 Feb. 3, 2011

Related U.S. Application Data

(62) Division of application No. 10/939,865, filed on Sep. 13, 2004, now Pat. No. 7,831,698.

(51) Int. Cl.
*G06F 15/173* (2006.01)
(52) U.S. Cl. ............... 709/223; 709/203; 707/E17.116
(58) Field of Classification Search ............... 709/223, 709/203; 707/E17.116
See application file for complete search history.

(56) References Cited

U.S. PATENT DOCUMENTS

| | | | |
|---|---|---|---|
| 5,794,234 A | 8/1998 | Church et al. | |
| 6,073,184 A | 6/2000 | Couturier et al. | |
| 6,094,688 A | 7/2000 | Mellen-Garnett et al. | |
| 6,185,625 B1 | 2/2001 | Tso et al. | |
| 6,230,160 B1 | 5/2001 | Chan et al. | |
| 6,332,163 B1 | 12/2001 | Bowman-Amuah | |
| 6,438,594 B1 | 8/2002 | Bowman-Amuah | |
| 6,708,172 B1 | 3/2004 | Wong et al. | |
| 6,721,779 B1* | 4/2004 | Maffeis | 709/202 |
| 6,742,015 B1 | 5/2004 | Bowman-Amuah | |
| 7,152,109 B2 | 12/2006 | Suorsa et al. | |
| 7,191,180 B2 | 3/2007 | Evans et al. | |
| 7,225,244 B2 | 5/2007 | Reynolds et al. | |
| 7,289,964 B1 | 10/2007 | Bowman-Amuah | |

(Continued)

FOREIGN PATENT DOCUMENTS

EP 1117033 7/2001

OTHER PUBLICATIONS

Moody, Scott Arthur. "Challenges in Building Scalable Network Centric Real-Time Information Disseminiation Systems," Proceedings of the Sixth IEEE International Symposium on Object-Oriented Real-Time Distributed Computing (ISORC'03), Piscataway, NJ, USA, IEEE, May 14, 2003, pp. 203-210.

*Primary Examiner* — Asad Nawaz
*Assistant Examiner* — Waseem Ashraf
(74) *Attorney, Agent, or Firm* — Harness, Dickey & Pierce, P.L.C.

(57) ABSTRACT

A system is disclosed for enabling interoperability of different Network-Centric Operation (NCO) environments. A first computer executable module may enable plug-able import proxies and export proxies for respectively importing data from and exporting data to different NCO environments. A second computer executable module may enable plug-able software operable for configuring imported data. An infrastructure may be incorporated that integrates the first and second computer executable modules.

13 Claims, 3 Drawing Sheets

U.S. PATENT DOCUMENTS

| | | |
|---|---|---|
| 7,349,980 B1 * | 3/2008 | Darugar et al. ............... 709/238 |
| 7,437,417 B2 | 10/2008 | Reynolds et al. |
| 2001/0022837 A1 | 9/2001 | Vasell et al. |
| 2002/0004856 A1 * | 1/2002 | Sudarshan et al. ............ 709/330 |
| 2002/0184357 A1 * | 12/2002 | Traversat et al. ............. 709/223 |
| 2003/0023636 A1 | 1/2003 | Lee et al. |
| 2003/0033283 A1 | 2/2003 | Evans et al. |
| 2003/0236856 A1 * | 12/2003 | Bird et al. .................... 709/217 |
| 2004/0174822 A1 | 9/2004 | Bui |
| 2005/0102260 A1 | 5/2005 | Spring et al. |
| 2005/0114517 A1 * | 5/2005 | Maffeis ........................ 709/227 |
| 2005/0190708 A1 * | 9/2005 | Farr et al. ..................... 370/294 |
| 2005/0198247 A1 | 9/2005 | Perry et al. |
| 2005/0216555 A1 * | 9/2005 | English et al. ............... 709/204 |
| 2005/0251527 A1 | 11/2005 | Phillips et al. |
| 2006/0167968 A1 * | 7/2006 | Reynolds et al. ............. 709/202 |
| 2007/0198629 A1 | 8/2007 | Ganguly et al. |

* cited by examiner

SYSTEMS AND METHODS ENABLING INTEROPERABILITY BETWEEN NETWORK-CENTRIC OPERATION (NCO) ENVIRONMENTS

CROSS-REFERENCE TO RELATED APPLICATIONS

This application is a divisional of U.S. patent application Ser. No. 10/939,865 filed on Sep. 13, 2004. The disclosure of the above application is incorporated herein by reference.

FIELD

The present invention generally relates to Network-Centric Operation (NCO) environments, and more particularly (but not exclusively) to systems and methods enabling interoperability between different NCO environments.

BACKGROUND

Different Network-Centric Operation (NCO) environments often have interfaces that are incompatible with one another and/or are associated with different data configurations and formats. Therefore, ad hoc software applications are usually required before these different NCO environments can interoperate and share data with one another. These ad hoc software applications, however, normally require many unique interoperability services for bridging the different NCO environments together. And because these software interoperability features are specially designed for specific NCO environments, software must normally be redesigned each time any changes occur to the NCO environments themselves and/or to the programs operating within the NCO environments.

By way of further background, an NCO environment can generally refer to and include a robust, globally interconnected, network environment (including infrastructure, systems, processes, and people) in which knowledge, information, and data can be shared timely and seamlessly among users, applications and platforms within that particular NCO environment even when separated geographically or organizationally. By allowing knowledge, information, and data from even geographically or organizationally separated groups to be combined faster and in a more meaningful way, an NCO environment can facilitate decision making and coordinated action that is more effective and timely. One exemplary use of an NCO environment includes the United States Department of Defense in which an NCO environment has enabled substantially improved military situational awareness and significantly shortened decision making cycles.

SUMMARY

In one aspect the present disclosure relates to a system for enabling interoperability of different Network-Centric Operation (NCO) environments. The system may comprise a first computer executable module enabling plug-able import proxies and export proxies for respectively importing data from and exporting data to different NCO environments; a second computer executable module enabling plug-able software operable for configuring imported data; and an infrastructure integrating the first and second computer executable modules.

In another aspect the present disclosure may comprise a program for enabling interoperability of different Network-Centric Operation (NCO) environments. The program may comprise a first computer executable module enabling plug-able import proxies and export proxies for respectively importing data from and exporting data to different NCO environments. A second computer executable module may enable plug-able software operable for configuring imported data. A software infrastructure may integrate the first and second computer executable modules.

In still another aspect the present disclosure relates to a system enabling interoperability of different Network-Centric Operation (NCO) environments. The system may comprise a first computer executable module for enabling plug-able import proxies for importing data from different NCO environments. A second computer executable module may enable plug-able software operable for configuring imported data. An infrastructure may be incorporated that integrates the first and second computer executable modules. Finally, the system may include an import proxy for each topic about which data is published to an NCO environment.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of the preferred embodiments is merely exemplary in nature and is in no way intended to limit the invention, its application, or uses.

According to one aspect, the invention provides the means by which different Network-Centric Operation (NCO) environments can interoperate with one another. In various implementations, interoperability software seamlessly routes and, as required, optionally configures (e.g., filters, translates, transforms, converts, etc.) data from one NCO environment to another NCO environment in a manner that can be transparent to the publishers and subscribers. In preferred implementations, this interoperability software is reusable, adaptable, and plug-able to multiple NCO environments, thereby eliminating, or at least reducing, the software development normally required to interface to a dissimilar NCO environment.

Figure 1:
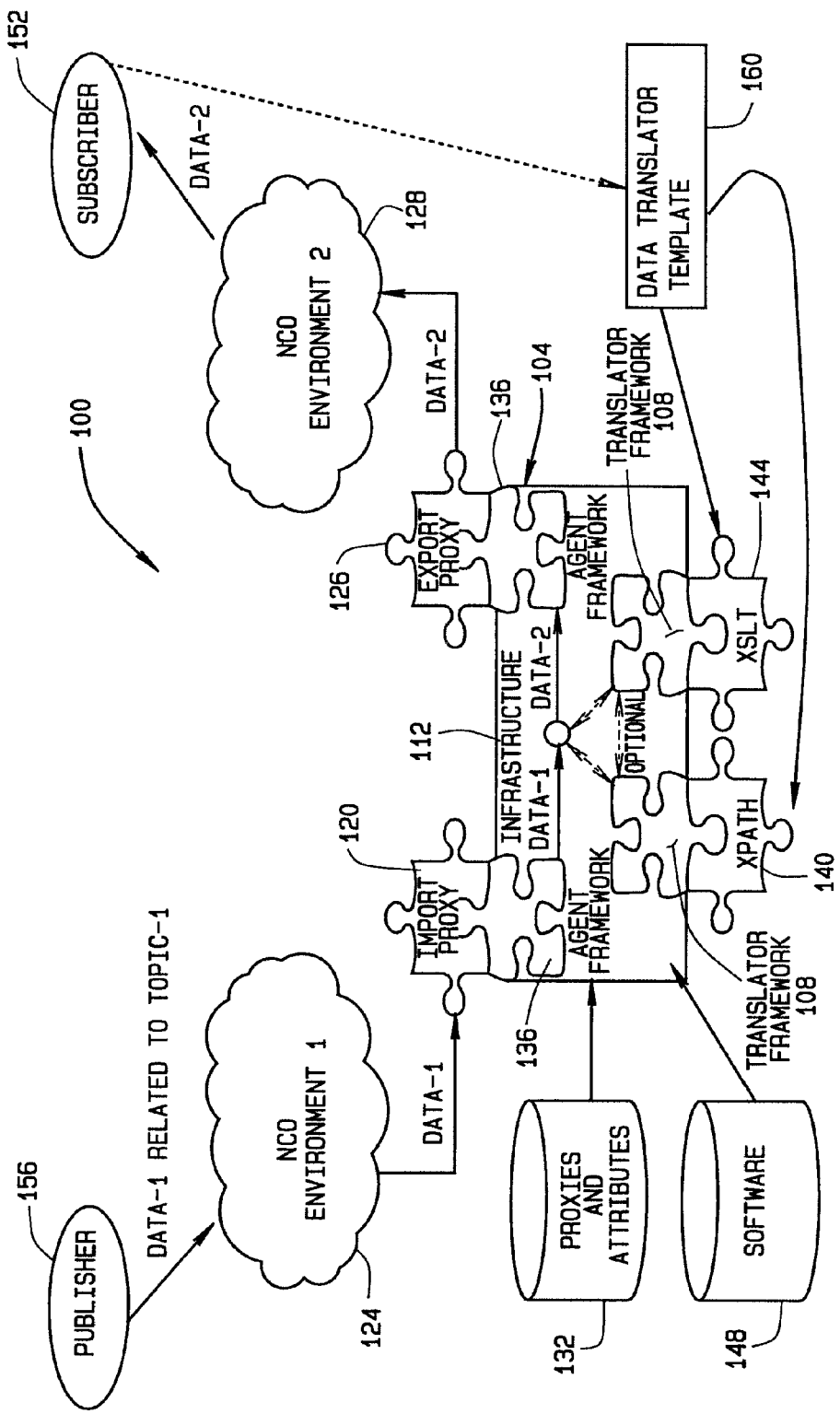
FIG. 1 is a high level diagram of a system enabling interoperability between different Network-Centric Operation (NCO) environments according to an exemplary implementation of the invention.

FIG. 1 illustrates an exemplary system 100 in accordance with the principles of this invention. As shown, system 100 generally includes an Agent Software Framework 104 and a Translator Software Framework 108. System 100 also includes a software infrastructure 112 that integrates Agent Framework 104 with Translator Framework 108. Because these software components 104, 108, and 112 are not custom/specific to any one particular NCO environment, they can be reused in connection with a variety of NCO environments. But unique features for a particular NCO environment can also be integrated into one or more of the software components 104, 108, and 112, depending on the particular application in which system 100 will be used.

The various software components 104, 108, and 112 can all reside on a single network device or be distributed on several interconnected devices or even on several interconnected networks.

In a preferred implementation, Agent Framework 104 comprises adaptable and plug-able software operable for supporting different NCO environments and business programs with minimal (or at least reduced) software application rewrites.

Figure 2:
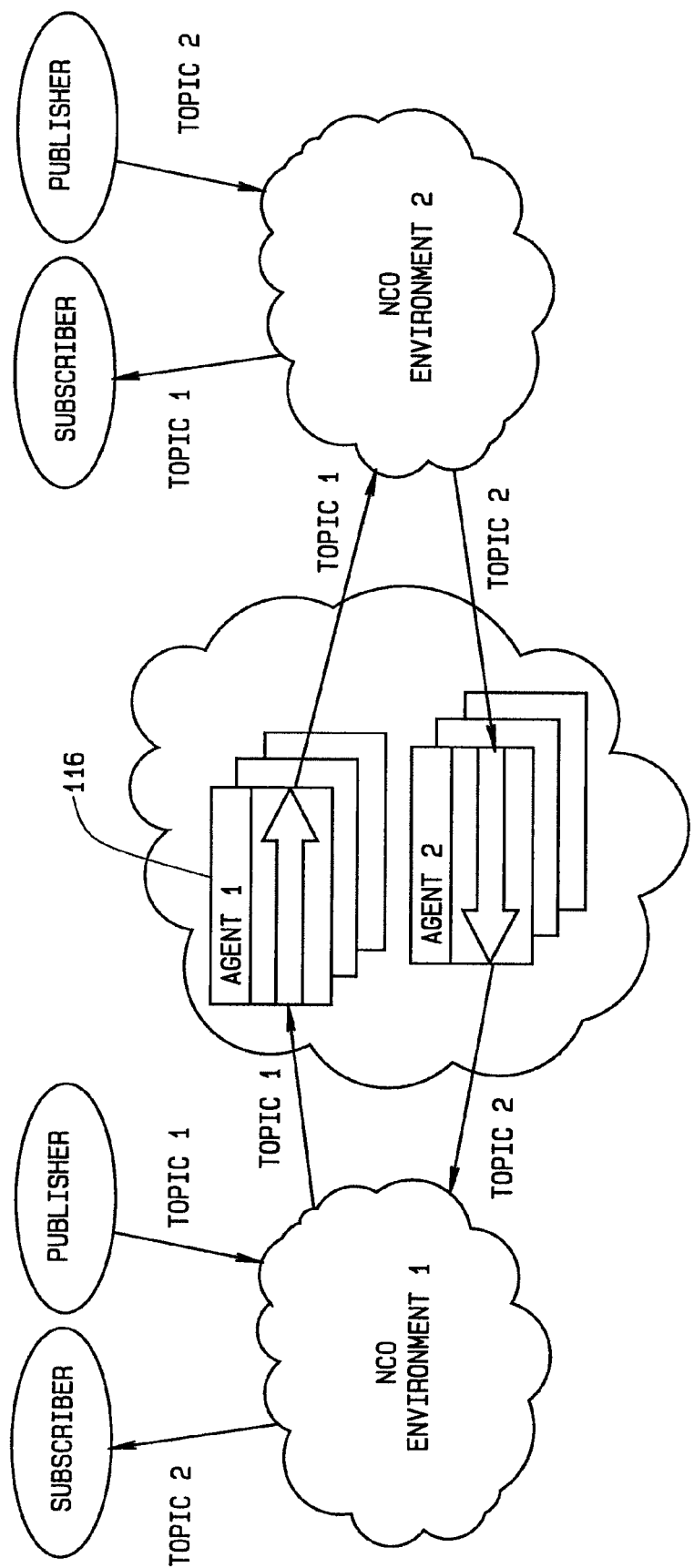
FIG. 2 is a high level diagram illustrating a system including an agent for each topic in the NCO environments according to an exemplary implementation of the invention.

As shown in FIG. 2, Agent Framework 104 can include a plurality of agents 116, preferably one for each topic. Agent Framework 104 and its agents 116 can be used to replace export and import proxies representing different or dissimilar NCO business programs.

The term "topic" can generally refer to and include information being exchanged between environments that is put into a context meaningful to the environments. An example of a topic can include tracking or targeting information which can be primarily situational awareness information to the different environments, but which has a different context for the command and control environment than it does for the attack platform.

With further reference to FIG. 1, each agent 116 includes an import proxy 120 and an export proxy 126 for respectively importing and exporting data on behalf of a subscriber. The import proxy 120 can be used to import data from one NCO environment 124, and the export proxy 126 can be used to export data to another NCO environment 128.

In preferred implementations, system 100 maintains a library or database 132 of import and export proxies (and their related attributes) from which import and/or export proxies can be selected for use as the need arises. The library 132 can also include attributes associated with each proxy so that system 100 can distinguish between the different proxies for an NCO environment. Exemplary attributes that can be associated with the proxies can include information for identifying, certifying, authenticating, and/or distinguishing between the different proxies.

Agent Framework 104 also includes facades 136. The facades 136 allow import and export proxies to be plugged into and communicate with Agent Framework 104. These facades 136 preferably allow import and export proxies to be readily interchanged with other respective import and export proxies with minimal (or at least reduced) software application rewrites.

The term "facade" can generally refer to and include a software module that provides a simplified interface to a large body of code, such as a class library. In a service oriented paradigm, a facade can allow a service requester to dynamically select a particular service provider that provides the service described in the interface. A facade also allows the service provider to be plug-able into a service framework.

Translator Framework 108 preferably includes a plug-able software framework (e.g., facade 138 in FIG. 3) that allows system 100 to use software 140 and 144 for configuring (e.g., filters, translates, transforms, converts, etc.) data between different NCO environments. In preferred implementations, system 100 maintains a library or database 148 of available software for configuring data.

In addition, Translator Framework 108 can also allow system 100 to receive from one or more subscribers software for configuring data. In this way, a subscriber 152 can provide its own software rather than selecting software from the list 148. By way of example only, a subscriber 152 might obtain one or more software translators from the Internet, and then provide the same to system 100. Software provided by a subscriber can be stored for future reuse, such as for example to configure data imported from a third NCO environment (not shown).

Figure 3:
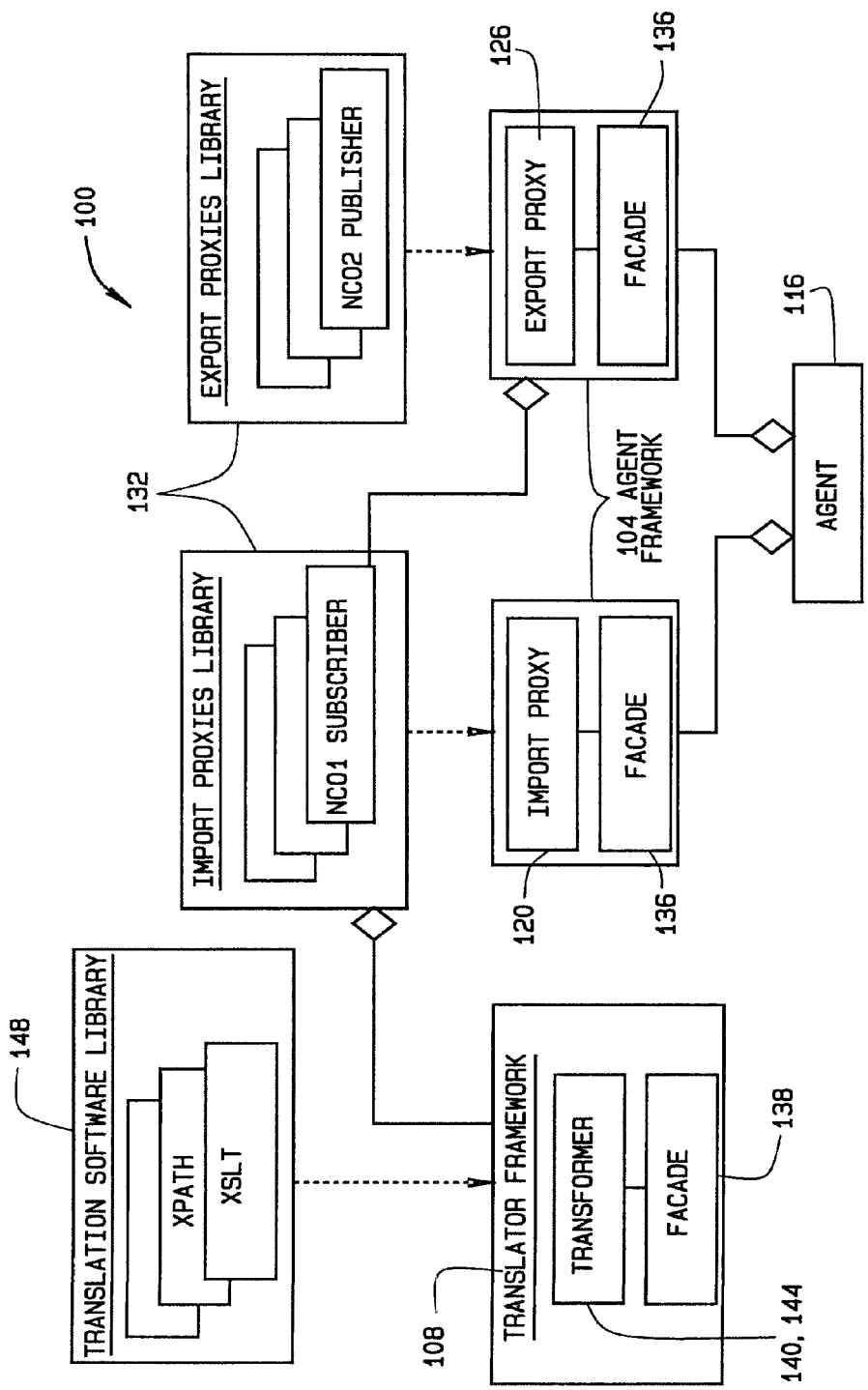
FIG. 3 is a uniform model language (UML) class diagram of a system enabling interoperability between different NCO environments according to an exemplary implementation of the invention.

In FIGS. 1 and 3, exemplary software 140 and 144 that can be used to configure data are shown respectively as XML Path Language (XPath) and Extensible Stylesheet Language Transformation (XSLT). XPath can be used for filtering data, and XSLT can be used for transforming portable document format (PDF) data to Extensible Markup Language (XML) data, and vice versa. Alternatively, other software translators can also be used including commercially available and off-the-shelf products. In FIG. 3, the diamonds represent containment, for example, NCO Subscriber1 contains export proxy 126.

With further reference to FIG. 1, a description will now be provided in connection with an exemplary operation of system 100 in which system 100 routes and optionally configures data, as required, from a first NCO environment 124 to a second NCO environment 128.

A publisher 156 may publish data (e.g., PDF data, etc.) related to a particular topic in the first NCO environment 124, such as an online publication related to fly fishing. The publisher 156 may inform others (e.g., subscriber 152, among others) about the topic and data published to the first NCO Environment 124.

A subscriber 152 may find out about the topic and have sufficient interest to register itself as a subscriber of the topic but in its own different NCO environment 128. Although the subscriber 152 to the topic (which in this particular example is fly fishing) in the second NCO environment 128 may want to access the fly fishing data, the subscriber 152 may not be able to understand the particular type of data published to the first NCO environment 124. Instead, the subscriber 152 may only be able to understand data in a certain format or configuration. For example, the subscriber 152 may be able to understand XML data, but not be able to understand PDF data.

If the subscriber 152 can only access data in a certain format or configuration, the subscriber 152 may provide instructions to system 100 on how to filter and transform data to make it understandable and accessible to the subscriber 152. By way of example, these instructions can be included within a data translation template 160 (e.g., data schema and data stylesheet) provided by the subscriber 152. The data translation template 160 can be used by system 100 when filtering and translating data from the first NCO environment 124 before publishing the data to the second NCO environment 128.

The subscriber 152 can also select one or more software translators 140 and 144 from the software library 148. In the illustrated implementation of FIG. 1, examples of such software include XPath for filtering data, and XSLT for transforming PDF data to XML data, and vice versa. Alternatively, other software translators/converters can also be used including proprietary, commercially available, and off-the-shelf products.

Rather than selecting software from the list 148, other implementations can include the subscriber 152 providing its own software. By way of example only, the subscriber 152 might obtain a software translator from the Internet, and then provide the same to Translator Framework 108 for use by system 100. Software provided by a subscriber can then be stored within the list 148 for future reuse, such as for example to configure data from a third NCO environment (not shown).

A suitable import proxy can be selected from the library 132. The selected import proxy can then be registered as a subscriber to the topic in the first NCO environment 124, thereby becoming an active participant capable of receiving receive data from the first NCO environment 124.

But when a suitable import proxy does not already exist within the library 132, a subscriber to the first NCO environment 124 can be created. This subscriber can be plugged into Agent Framework 104 via façade 136 so that this newly created subscriber can be used as an import proxy. This newly created subscriber can then be stored within the list 132 for future reuse, such as for example importing data from a third NCO environment.

A suitable export proxy can also be selected from the library 132. The selected export proxy can then be registered as a publisher to the topic in the first NCO environment 124 such that it becomes an active participant of and can publish data to the second NCO environment 128.

But when a suitable export proxy does not already exist within the list 132, a publisher to the second NCO environment 128 can be created. This publisher can be plugged into Agent Framework 104 via façade 136, thereby enabling this newly created publisher to be used as an export proxy. This newly created publisher can then be stored within the list 132 for future reuse, such as for example exporting data to a third NCO environment.

Continuing with this particular example, the import proxy 120 can import data from the first NCO environment 124. The imported data can be configured by using one or more software components 140 and 144, that is if the imported data is not already in accordance with the data template 160 provided by subscriber 152.

In the illustrated implementation, imported data can be filtered by software translator 140 (e.g., XPath, etc.). By way of example only, software translator 140 may filter the imported data to remove data already accessed by the subscriber 152, such as data published periodically to the first NCO environment 124. Whether imported data is filtered depends on the particular application.

Either before or after being filtered, imported data can also be transformed or converted by software translator 144 (e.g., XSLT, etc.) in accordance with the instructions provided by the subscriber 152. By way of example only, software translator 144 may transform PDF data to XML data, or vice versa. Whether imported data is transformed, translated, or converted depends on the particular application.

The export proxy 126 can export or publish data to the second NCO environment 128 that is in accordance with the subscriber's instructions. Ultimately, the data published by the export proxy 126 to the second NCO environment 128 can be routed to the subscriber 152 thereby allowing the subscriber 152 to access the data in the particular format or configuration that the subscriber 152 requested.

Accordingly, various implementations of the invention advantageously provide unique solutions to the ever-increasing problem of interoperability between dissimilar NCO environments. Various implementations provide the means to seamlessly route, filter, and translate information as required by the different NCO environments. In various implementations, this is accomplished using an open system architecture design that provides the users/designers of each NCO environment to specify the interoperability method by using available software components (commercial or proprietary) or by creating and interfacing a unique solution onto the interoperability core software with minimal effort. This seamless exchange of information can work in both directions so that when the users/designers of one NCO environment need to send information to another NCO environment, various implementations of this invention can route, filter, and translate the information as required.

By utilizing an interoperability software framework that is reusable, adaptable, and plug-able to multiple NCO environments, various implementations can eliminate, or at least reduce, the software development required to interface to a dissimilar NCO environment. Furthermore, aspects of the invention can be implemented with existing NCO environments with little to no changes being required for the NCO environments and their applications.

The computer readable program code can be programmed using any of a wide range of suitable computer readable programming languages that are now known in the art or that may be developed in the future. In preferred implementations, JAVA is used for Agent Framework 104, Translator Framework 108, and software infrastructure 112.

The computer readable program code can include one or more functions, routines, subfunctions, and subroutines, and need not be combined in a single package but may instead be embodied in separate components. In addition, the computer readable program code may be a stand-alone application, or may be a plug-in module for an existing application and/or operating system. Alternatively, the computer readable program code may be integrated into an application or operating system. In yet another embodiment, the computer readable program code may reside at one or more network devices (not shown), such as an administrator terminal, a server, etc.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system that resides on a computer or one or more devices, for enabling interoperability of different Network-Centric Operation (NCO) environments, the system comprising:

a first computer executable module enabling plug-able import proxies and export proxies for respectively importing data from, and exporting data to, different NCO environments, the first computer executable module further being registered as a publisher for a topic in a first NCO environment;

a second computer executable module enabling plug-able software operable for configuring imported data, the second computer executable module further being registered as a subscriber for the topic in a second NCO environment different from the first NCO environment;

an infrastructure integrating the first and second computer executable modules, the infrastructure having a plurality of facades configured to interchangeably receive a plurality of predefined import proxies and a plurality of predefined export proxies;

a first library of different proxies including different input proxies and different export proxies;

a second library of different software translators;

the second computer executable module adapted to generate and transmit a data translation template that defines how to filter and transform data such that said data will be understandable by the second computer executable module;

the system configured to select from the first library a specific import proxy and a specific export proxy into a façade of the infrastructure, and to connect the specific import proxy and the specific export proxy, into one of the facades of the infrastructure; and the system further configured to use information contained in the data translation template to select a plurality of software translators and to connect a predefined plurality of software translators into the facades, the infrastructure further configured to provide for data transfer among proxies and translators received in the facades, and the selecting performed based on a plurality of attributes associated with the predefined proxies.

2. The system of claim 1, wherein the system is further configured to register the selected import proxy as a subscriber in the first NCO environment, and the selected export proxy as a publisher for the topic in the second NCO environment.

3. The system of claim 1, wherein the system further configured to receive the data, via the selected import proxy, from the first application in the first NCO environment, and to publish the data, via the selected export proxy, to the second NCO environment.

4. The system of claim 1, wherein the system includes an import proxy for each topic about which data is imported from an NCO environment.

5. The system of claim 1, wherein the system includes an export proxy for each topic about which data is exported to an NCO environment.

6. A non-transitory computer readable storage medium having stored thereon one or more computer modules, enabling interoperability of different Network-Centric Operation (NCO) environments, comprising: a first computer executable module enabling plug-able import proxies and export proxies for respectively importing data from and exporting data to different NCO environments, the first computer executable module further being registered as a publisher for a topic in a first NCO environment; a second computer executable module enabling plug-able software operable for configuring imported data, the second computer executable module further being registered as a subscriber for the topic in a second NCO environment different from the first NCO environment; and a software infrastructure integrating the first and second computer executable modules, the infrastructure having a plurality of facades configured to interchangeably receive a plurality of predefined import proxies and a plurality of predefined export proxies; a first library of different proxies including different input proxies and different export proxies; a second library of different software translators; the second computer executable module adapted to generate and transmit a data translation template that defines how to filter and transform data such that said data will be understandable by the second computer executable module; the program configured to select from the first library a specific import proxy and a specific export proxy, and to connect the selected proxies into a facade of the infrastructure, and to connect the specific import proxy and the specific export proxy, into one of the facades of the infrastructure; and the program further configured to use information contained in the data translation template to select a plurality of software translators and to connect a predefined plurality of software translators into the facades, the infrastructure further configured to provide for data transfer among proxies and translators received in the facades, and the selecting performed based on a plurality of attributes associated with the predefined proxies.

7. The program of claim 6, wherein the program is further configured to register the selected import proxy as a subscriber in the first NCO environment, and the selected export proxy as a publisher for the topic in the second NCO environment.

8. The program of claim 6, wherein the program is further configured to receive the data, via the selected import proxy, from the first application in the first NCO environment, and to publish the data, via the selected export proxy, to the second NCO environment.

9. The program of claim 6, wherein the program includes an import proxy for each topic about which data is imported from an NCO environment.

10. The program of claim 6, wherein the program includes an export proxy for each topic about which data is published to an NCO environment.

11. A system that includes a computer and one or more computer modules, for enabling interoperability of different Network-Centric Operation (NCO) environments, the system comprising:

a first computer executable module enabling plug-able import proxies and export proxies for respectively importing data from, and exporting data to, different NCO environments;

a second computer executable module enabling plug-able software operable for configuring imported data, the second computer executable module further being registered as a subscriber for the topic in a second NCO environment different from the first NCO environment;

an infrastructure integrating the first and second computer executable modules, the infrastructure having a plurality of facades configured to interchangeably receive a plurality of predefined import proxies and a plurality of predefined export proxies;

a first library of different proxies including different input proxies and different export proxies;

a second library of different software translators;

the second computer executable module adapted to generate and transmit a data translation template that defines how to filter and transform data such that said data will be understandable by the second computer executable module;

the system configured to select from the first library a specific import proxy and a specific export proxy and to connect the selected proxies into a façade of the infrastructure, and to connect the specific import proxy and the specific export proxy, into one of the facades of the infrastructure; and the system further configured to use information contained in the data translation template to select a plurality of software translators and to connect a predefined plurality of software translators into the facades, the infrastructure further configured to provide for data transfer among proxies and translators received in the facades, the infrastructure configured to provide for data transfer among proxies and translators received in the facades, and the selecting performed based on a plurality of attributes associated with the predefined proxies.

12. The system of claim 11, wherein the first computer executable module further being registered as a publisher for a topic in a first NCO environment; wherein the NCO environment provides a first publish service and a first subscribe service; and wherein the second NCO environment provides a second publish service and a second subscribe service.

13. The system of claim 11, wherein the system is further configured to register the selected import proxy as a subscriber in a first NCO environment to the topic, to register the selected export proxy as a publisher for the topic in the second NCO environment, to have the selected import proxy receive the data from the first computer executable module as a publisher in the first NCO environment; and to publish the data, via the selected export proxy, to the second NCO environment, with publishing performed using a second publish service.

* * * * *